US010009676B2

(12) United States Patent
Contolini et al.

(10) Patent No.: US 10,009,676 B2
(45) Date of Patent: Jun. 26, 2018

(54) VOICE CONTROL SYSTEM WITH MULTIPLE MICROPHONE ARRAYS

(71) Applicant: Storz Endoskop Produktions GmbH, Tuttlingen (DE)

(72) Inventors: Matteo Contolini, Santa Barbara, CA (US); Ted Applebaum, Santa Barbara, CA (US); Sankaran Panchapagesan, Mountain View, CA (US)

(73) Assignee: Storz Endoskop Produktions GmbH, Tuttlingen (DE)

( * ) Notice: Subject to any disclaimer, the term of this patent is extended or adjusted under 35 U.S.C. 154(b) by 256 days.

(21) Appl. No.: 14/531,798

(22) Filed: Nov. 3, 2014

(65) Prior Publication Data
US 2016/0125882 A1    May 5, 2016

(51) Int. Cl.
  *G10L 21/00* (2013.01)
  *H04R 1/08* (2006.01)
  (Continued)

(52) U.S. Cl.
  CPC .............. *H04R 1/08* (2013.01); *G10L 15/20* (2013.01); *G10L 15/22* (2013.01); *H04R 3/005* (2013.01);
  (Continued)

(58) Field of Classification Search
  CPC .......................... G10L 15/22; G10L 2015/223
  (Continued)

(56) References Cited

U.S. PATENT DOCUMENTS 5,778,082 A    7/1998  Chu et al.
6,137,887 A   10/2000  Anderson
(Continued)

FOREIGN PATENT DOCUMENTS

WO    2009065542 A1    5/2009

OTHER PUBLICATIONS

Improved ROVER using Language Model Information, Holger Schwenk and Jean-Luc Gauvain, {schwenk, gauvain} @limsi.fr LIMSI-CNRS, BP 133 91403 Orsay cedex, France. Published in ISCA ITRW Workshop on Automatic Speech Recognition: Challenges for the new Millenium, Paris, pp. 47-52, Sep. 2000.
(Continued)

*Primary Examiner* — Jakieda Jackson
(74) *Attorney, Agent, or Firm* — Whitmyer IP Group LLC

(57) ABSTRACT

A voice controlled medical system with improved speech recognition includes a first microphone array, a second microphone array, a controller in communication with the first and second microphone arrays, and a medical device operable by the controller. The controller includes a beam module that generates a first beamed signal using signals from the first microphone array and a second beamed signal using signals from the second microphone array. The controller also includes a comparison module that compares the first and second beamed signals and determines a correlation between the first and second beamed signals. The controller also includes a voice interpreting module that identifies commands within the first and second beamed signals if the correlation is above a correlation threshold. The controller also includes an instrument control module that executes the commands to operate said medical device.

34 Claims, 11 Drawing Sheets

(51) Int. Cl.
*G10L 15/20* (2006.01)
*G10L 15/22* (2006.01)
*H04R 3/00* (2006.01)
G10L 21/0216 (2013.01)
H04R 1/02 (2006.01)
H04R 1/40 (2006.01)

(52) U.S. Cl.
CPC .............. *G10L 2015/223* (2013.01); *G10L 2021/02166* (2013.01); *H04R 1/028* (2013.01); *H04R 1/406* (2013.01)

(58) Field of Classification Search
USPC .......................................... 704/275, 231, 233
See application file for complete search history.

(56) References Cited

U.S. PATENT DOCUMENTS

| | | | |
|---|---|---|---|
| 6,219,645 | B1 | 4/2001 | Byers |
| 6,999,593 | B2 | 2/2006 | Rui et al. |
| 7,039,199 | B2 | 5/2006 | Rui |
| 7,158,645 | B2 | 1/2007 | June |
| 8,983,089 | B1 * | 3/2015 | Chu ..................... H04R 3/005 381/58 |
| 9,530,407 | B2 * | 12/2016 | Katuri .................... G10L 15/20 |
| 2004/0165735 | A1 | 8/2004 | Opitz |
| 2008/0285772 | A1 | 11/2008 | Haulick |
| 2009/0248408 | A1 * | 10/2009 | Ishibashi ................ H04M 3/56 704/226 |
| 2010/0014690 | A1 | 1/2010 | Wolff et al. |
| 2011/0063429 | A1 | 3/2011 | Contolini et al. |
| 2013/0272538 | A1 * | 10/2013 | Kim ...................... G01S 3/8006 381/92 |
| 2014/0161296 | A1 * | 6/2014 | Andersen .............. H04R 1/083 381/361 |
| 2014/0276934 | A1 * | 9/2014 | Balaji ................ A61B 19/2203 606/130 |
| 2015/0006176 | A1 * | 1/2015 | Pogue .................... G10L 15/22 704/249 |
| 2015/0092958 | A1 * | 4/2015 | Van Tol ................. H04R 27/00 381/92 |
| 2015/0124980 | A1 * | 5/2015 | Vilermo ................ H04R 3/005 381/58 |

OTHER PUBLICATIONS

John McDonough, Kenichi Kumatani, Bhiksha Raj, "Microphone Array Processing for Distant Speech Recognition: Spherical Arrays", in Proc. Asia-Pacific Signal and Information Processing Association (APSIPA), 2012 and Brandstein, M., and Ward, D. (2001) Microphone Arrays.

Krishnamurthy, Harish Kashyap, "Study of algorithms to combine multiple automatic speech recognition (ASR) system outputs" (2009). Electrical and Computer Engineering Master's Theses. Paper 24.

\* cited by examiner

VOICE CONTROL SYSTEM WITH MULTIPLE MICROPHONE ARRAYS

FIELD OF THE INVENTION

The apparatus described herein generally relates to the field of voice controlled medical systems; and, more directly, to the field of such medical systems using remote microphones in an operating environment.

BACKGROUND OF THE INVENTION

Modern operating rooms for performing surgery have seen several advancements over the past two decades. In the late $20^{th}$ century, state-of-the-art operating rooms included several electronic surgical instruments (i.e. electrosurgical units, insufflators, endoscopes, etc.). These instruments were separately operated by the surgeon and members of the surgical team. The industry improved upon this type of operating room by integrating the various instruments into a unified system. With this configuration, the surgeon and/or members of the team use a central controller (or surgical control unit) to control all of the instruments through a single interface (often a graphical-user interface). Generally speaking, these central control units were built using modified personal computers and the operating rooms using them are commonly referred to as "digital operating rooms".

The establishment of the digital operating room paved the way for the voice controlled operating room. With this system, a member of the surgical team (usually the surgeon) wears a headset with a microphone. The surgeon issues spoken commands into the headset, these commands are sent to the central controller that controls the various instruments to perform desired tasks or make on-the-fly adjustments to operating parameters. The central controller operates software including a speech-to-text converter (i.e. speech recognition software) to interpret and execute the voice commands. Since computers often have difficulty interpreting spoken language, typical systems include audible confirmation feedback to the surgical team, notifying them that a command has been understood and executed by the controller. Since sterility is critically important in all surgical procedures, this touch-free control system represented a significant advancement.

The voice-controlled digital operating room was further improved by the introduction of the wireless voice-control headset. This gave the surgeon greater mobility and eliminated the microphone cable as a possible source of contamination or nuisance for the surgeon. Voice controlled digital operating rooms with wireless headsets represent the modern state-of-the-art in the field.

Although this type of system has worked well for the convenience and efficacy of the surgical team and the maintenance of sterility, it has introduced certain heretofore unknown safety issues. One such safety issue is the problem of surgeons issuing commands into wireless headsets and input devices that are mated with a nearby room's surgical control unit. In that situation, surgeons may attempt to control a surgical control unit present in the room they are occupying, only to inadvertently control another surgical control unit in a nearby room where an unrelated procedure is being performed. This problem is exacerbated by the fact that surgeons may repeat commands in a vain attempt to operate the surgical control unit in the room they are occupying. This can result in injury to the patient and surgical team and/or damage to the equipment in the nearby room.

Moreover, a surgical team must keep track of the headset and ensure that the surgeon is wearing it prior to the procedure. Although they are less intrusive and more convenient than prior systems, the wireless headsets are still a source of potential contamination and nuisance for the surgeon.

The problems associated with wireless headset microphones can be eliminated by replacing them with ambient microphones located inside the operating room that receive the surgeon's commands. By using ambient microphones, the wireless headset is eliminated as a potential source of contamination. Furthermore, issuing commands to the wrong operating room control unit is impossible. However, the use of ambient microphones introduces new problems. Ambient microphone voice control systems use similar speech recognition software as headset voice control systems. Headsets receive relatively "clean" speech input with a high signal-to-noise ratio as a result of being very near the source of the speech commands. However, this advantage is not present with ambient microphones and the software that interprets speech commands is poorly adapted to deal with the additional background noise, echoes, reverberation, and distortion present in the audio data gathered by ambient microphones.

The problems of poor sound reception and poor voice interpretation with ambient microphones are compounded by the fact that ambient microphones cannot determine where sounds originate. As a result, the ambient microphone cannot discriminate between sounds originating from equipment in the corner of an operating room and commands issued by the surgeon next to the operating table. Moreover, the ambient microphones cannot discriminate between speech originating from different individuals in the room. This can result in degraded speech recognition performance or even safety hazards if the control unit misinterprets and executes "commands" it receives from environmental noise or unrelated speech.

There remains a need in the art for an ambient microphone voice controlled surgical system that can restrict the locations from which voice commands are accepted and ignore interfering sounds from its operating environment.

SUMMARY OF THE INVENTION

A voice controlled medical system with improved speech recognition includes a first microphone array, a second microphone array, a controller in communication with the first and second microphone arrays, and a medical device operable by the controller. The controller includes a beam module that may generate first and second beamed signals. The beamed signal may be associated with a sound signal and a beam angle, which is an estimate of the angular position of a sound source with respect to an axis of the microphone array. The sound signal may have higher signal-to-noise ratio than obtainable from a single microphone at the same location as the microphone array, due to processing by a beam-forming module which is associated with, or incorporated in, the microphone array. The controller may also include a comparison module that compares the first and second beamed signals to determine if the first and second beamed signals contain a command uttered by a single user. For example, the comparison may determine that the same command is contained in the first and second beamed signals by determining the correlation between the first and second beamed signals. The controller may also use the known positions, orientations and beam angles of the first and second microphone arrays to estimate the location of a sound source to determine if the first and second beamed signals correspond to the same user or if a command is contained in the firs and second beamed signals. The controller may also include a voice interpreting module that identifies commands within the first and second beamed signals. For example, if the correlation is above a correlation threshold. The controller also includes an instrument control module that executes the commands to operate said medical device.

In some embodiments, the first microphone array includes a first longitudinal axis and the second microphone array includes a second longitudinal axis. In some embodiments, the first longitudinal axis and second longitudinal axis are perpendicular to each other. In some embodiments, the comparison module compares the first and second beamed signals to determine if a sound received by at least one of the microphone arrays originated in a command area. In some embodiments, locations of the first and second microphone arrays and the command area are adjustable. In some embodiments, the first and second microphone arrays are mounted on boom arms. In some embodiments, the beam module limits the angles of beams of the first and second beamed signals with respect to the first and second longitudinal axes. In some embodiments, the beam module forms a first beam of the first beamed signal in a direction of the source of the loudest sound received by the first microphone array, and forms a second beam of the second beam signal in a direction of the source of the loudest sound received by the second microphone array. In some embodiments, the instrument control module only executes commands from the loudest sound received by said first and second microphone arrays if the first and second beams intersect within a command area. In some embodiments, the comparison module determines that the first and second beamed signals correspond to separate competing sound sources if the correlation between the source of the loudest sound received by the first microphone array and the source of the loudest sound received by the second microphone array is below the correlation threshold.

A voice controlled medical system with improved speech recognition may include a first microphone array, a second microphone array, a controller in communication with the first and second microphone arrays that forms a first beam using the first microphone array and forms a second beam using the second microphone array, and a medical device operable by the controller. The controller determines whether the first and second beams intersect within a command area. The controller executes commands in signals from said first and second microphone arrays only when the first and second beams intersect within the command area.

In some embodiments, the first microphone array includes a first longitudinal axis and the second microphone array includes a second longitudinal axis. In some embodiments, the first longitudinal axis and second longitudinal axis are perpendicular to each other. In some embodiments, the system further includes a first audio signal from the first microphone array and a second audio signal from the second microphone array; and the controller compares the first audio signal to the second audio signal to determine if a sound received by at least one of the microphone arrays originated in the command area. In some embodiments, locations of the first and second microphone arrays and command area are adjustable. In some embodiments, the first and second microphone arrays are mounted on boom arms. In some embodiments, the controller only forms the first beam within a limited set of angles with respect to the first longitudinal axis, and the controller only forms the second beam within a limited set of angles with respect to the second longitudinal axis. In some embodiments, the controller forms the first beam in a direction of a source of a loudest sound received by the first microphone array, and forms the second beam in a direction of a source of a loudest sound received by the second microphone array. In some embodiments, the controller determines a location of an origin of the sound based on a first angle of the first beam with respect to the first longitudinal axis, a second angle of the second beam with respect to the second longitudinal axis, and locations of the first and second microphone arrays. In some embodiments, the controller does not execute commands contained in signals from the first and second microphone arrays if the correlation between the first and second beamed signals is lower than the correlation threshold. For example if the source of the loudest sound received by the first microphone array is different than the source of the loudest sound received by the second microphone array, the correlation would be expected to be lower than the correlation threshold.

A method of operating a medical device using voice commands includes receiving a plurality of first microphone signals from a first microphone array. The method further includes forming a first beamed signal using the first microphone signals via software executing on a processor. The method further includes receiving a plurality of second microphone signals from a second microphone array. The method further includes forming a second beamed signal using the second microphone signals via software executing on a processor. The method further includes comparing the sound signals of the first and second beamed signals to determine a level of correlation between the first and second beamed signals via software executing on a processor. The method further includes executing a command to operate the medical device contained in the first or second beamed signals only if the level of correlation exceeds a correlation threshold. The processor or devices may be incorporated in the microphone arrays or be external to the microphone arrays.

In some embodiments, the method includes determining a first angle of a first beam of the first beamed signal relative to the first array, determining a second angle of a second beam of the second beamed signal of the second array, determining a location of an intersection between the first and second beams, and executing a command to operate the medical device contained in the first or second beamed signals only if the level of correlation exceeds the correlation threshold and the intersection is within a predetermined region.

In some embodiments, the method further includes forming the first beam in a direction of a source of a loudest sound received by the first microphone array, and forming the second beam in a direction of a source of a loudest sound received by the second microphone array.

In some embodiments, the method includes determining an accepted range of second angles based on the first angle, determining whether the second angle falls within the accepted range, and only executing a command to operate the medical device contained in the first or second beamed signals if the second angle falls within the accepted range.

DETAILED DESCRIPTION OF THE INVENTION

Figure 1:
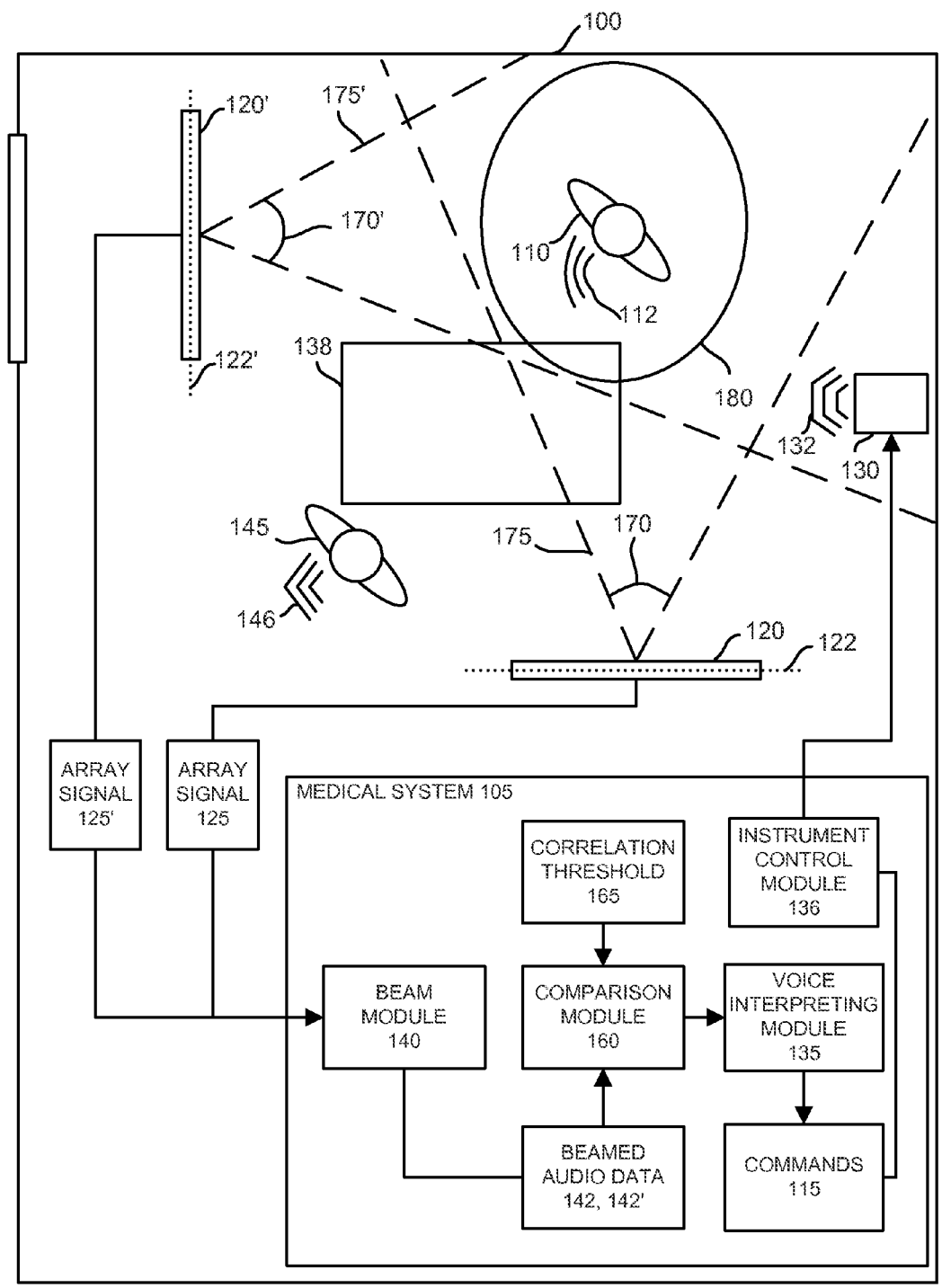
FIG. 1 is a block diagram of one embodiment of the voice controlled medical system in an operating environment.

FIG. 1 shows an operating environment 100 for a voice controlled medical system 105. During a medical procedure, operator 110 issues operator speech 112 that is received by microphone arrays 120,120'. Voice interpreting module 135 in voice controlled medical system 105 interprets operator speech 112 from array signals 125,125' to identify commands 115. Medical system 105 uses instrument control module 136 to send instructions to medical instruments 130 based on commands 115. Medical instruments 130 may be connected to a patient on surgical table 138. In this way, operator 110, who may be a surgeon, can perform an operation on a patient on surgical table 138 while controlling medical instruments 130 using voice commands 115.

In some embodiments, medical system 105 comprises a computer operating software. Medical system 105 is configured to only execute operator speech 112 from operator 110, who is within command area 180. Voice controlled medical system 105 selectively executes commands by receiving and analyzing signals from multiple microphone arrays 120,120' (two in this embodiment) pointed toward command area 180. In this embodiment, microphone arrays 120,120' are linear phased arrays with their longitudinal axes 122,122' positioned orthogonally to each other. Beam module 140 in medical system 105 uses arrays 120,120' to form beams by altering the phase relationship between signals from individual microphones within each array 120,120'. This permits medical system 105 to directionally record sounds in environment 100 by amplifying the amplitude of sounds emanating along each beam and reducing the amplitude of sounds emanating from elsewhere (by constructive and destructive interference, respectively). A more detailed description of beamforming algorithms can be found in John McDonough, Kenichi Kumatani, Bhiksha Raj, "Microphone Array Processing for Distant Speech Recognition: Spherical Arrays", in Proc. Asia-Pacific Signal and Information Processing Association (APSIPA), 2012 and Brandstein, M., and Ward, D. (2001) *Microphone Arrays*. Germany: Springer-Verlag, the content of which is incorporated by reference herein.

The range of permissible beam angles 170,170' creates a beam region 175,175' for each array 120,120'. Beam angle ranges 170,170' are different for each microphone array 120, 120' in some embodiments. In other embodiments, beam angle ranges 170,170' are the same for both arrays 120,120'.

Beam module 140 thereby enables each microphone array 120,120' to be directional and receive stronger signals from within beam regions 175,175'. As a result, voice interpreting module 135 will only interpret operator speech 112 issued from within beam regions 175,175'. Beam module 140 forms a beam from each microphone array 120, 120' toward the source of the loudest noise within its beam region 175,175' at that instant. Beam module 140 may be a component of medical system 105, microphone arrays 120,120', or another device, or be a standalone device.

Noise 132 can be generated by medical instruments 130 or other devices; persons 145 may also produce third-party speech 146 or other noise in operating environment 100. The patient in surgical table 138 may also be a source of unwanted noise. Beam module 140 (using the process described above) can eliminate environmental noise 132 from array signals 125,125'—particularly if noise 132 or third-party speech 146 emanates from outside of the beam regions 175,175' of both arrays 120,120' (such as speech 146 generated by person 145 in FIG. 1).

In addition to using the beams of each individual array 120,120' to filter out unwanted noise 132,146, medical system 105 may use the stereo input from array signals 125,125' to perform noise reduction or cancellation. However, performance can be further improved by localizing the sound source in multiple dimensions using multiple arrays 120,120'.

This is achieved by providing multiple microphone arrays 120,120' and beams such that the beams of the arrays 120,120' intersect (as shown in FIG. 1). By using two microphone arrays 120,120', sound sources can be localized in two dimensions. In some embodiments, longitudinal axes 122,122' of arrays 120,120' are configured orthogonal to each other so that beams from each array 120,120' intersect. Command area 180, where medical system 105 will accept speech commands 115 to operate medical instruments 130, is located within the area where the beams or beam regions 175,175' of both arrays 120,120' intersect. In this embodiment, command area 180 is placed near surgical table 138 for optimal speech recognition from a surgeon operating on a patient.

The two-dimensional arrangement of arrays 120,120' improves the signal-to-noise ratio and audio input quality of system 105 in at least two ways. First, comparison module 160 in medical system 105 correlates the two array signals 125,125' after they are converted to beamed signals 142,142' by beam module 140. If the beamed signals 142,142' from the two arrays 120,120' are not closely correlated, signals 125,125' may be rejected such that no speech interpretation is performed. Secondly, if the locations of arrays 120,120' relative to each other are known, the exact location of each sound source can be determined using the angles of the beams relative to arrays 120,120'. This information is used to determine whether the sound source is located within command area 180.

Comparison module 160 determines that beamed signals 142,142' likely contains desired commands 115 (i.e. is operator speech 112) if data from both arrays 120,120' (i.e. beamed signals 142,142') are sufficiently correlated, and the determined location of the sound source is within the command area 180. In other words, comparison module 160 compares beamed signals 142,142' (from first array 120 and second array 120', respectively) and determines if they are sufficiently highly correlated to exceed a correlation threshold 165. If comparison module 160 determines that a desired command 115 is likely contained within beamed signals 142,142' (i.e. that their correlation exceeds threshold 165), it will send beamed signals 142,142' to voice interpreting module 135 which will perform speech recognition on the beamed signals 142,142' and determine what, if any, commands 115 are contained therein. Correlation threshold 165 used by comparison module 160 for comparing beamed signals 142,142' from each array 120,120' can be adjusted to improve performance. For example, a lower or higher correlation threshold 165 can be applied in certain domains if it improves performance, such as the signal, spectrum, log-Mel-spectrum, or Mel-frequency cepstrum domain.

Voice interpreting module 135 uses speech recognition algorithms, such as hidden Markov model (HMM) analysis, to interpret operator speech 112. Operator speech 112 (within beamed signals 142,142') comprises a sequence of sounds—voice interpreting module 135 determines the order of the sequence to determine the words contained in operator speech 112. In embodiments that perform HMM analysis, voice interpreting module 135 interprets speech using voice interpreting data and a look-up table of sound patterns and corresponding words. In some embodiments, voice interpreting data are developed prior to installation in operating environment 100 using clean speech samples. In some embodiments, voice interpreting module 135 and/or comparison module 160 employ recognizer output voting error reduction (ROVER) using both array signals 125,125' to improve voice recognition performance. A more detailed and exemplary description of ROVER can be found in Krishnamurthy, Harish Kashyap, "Study of algorithms to combine multiple automatic speech recognition (ASR) system outputs" (2009). *Electrical and Computer Engineering Master's Theses.* Paper 24. http://hdl.handle.net/2047/d10019273, the content of which is incorporated by reference herein.

Figure 2:
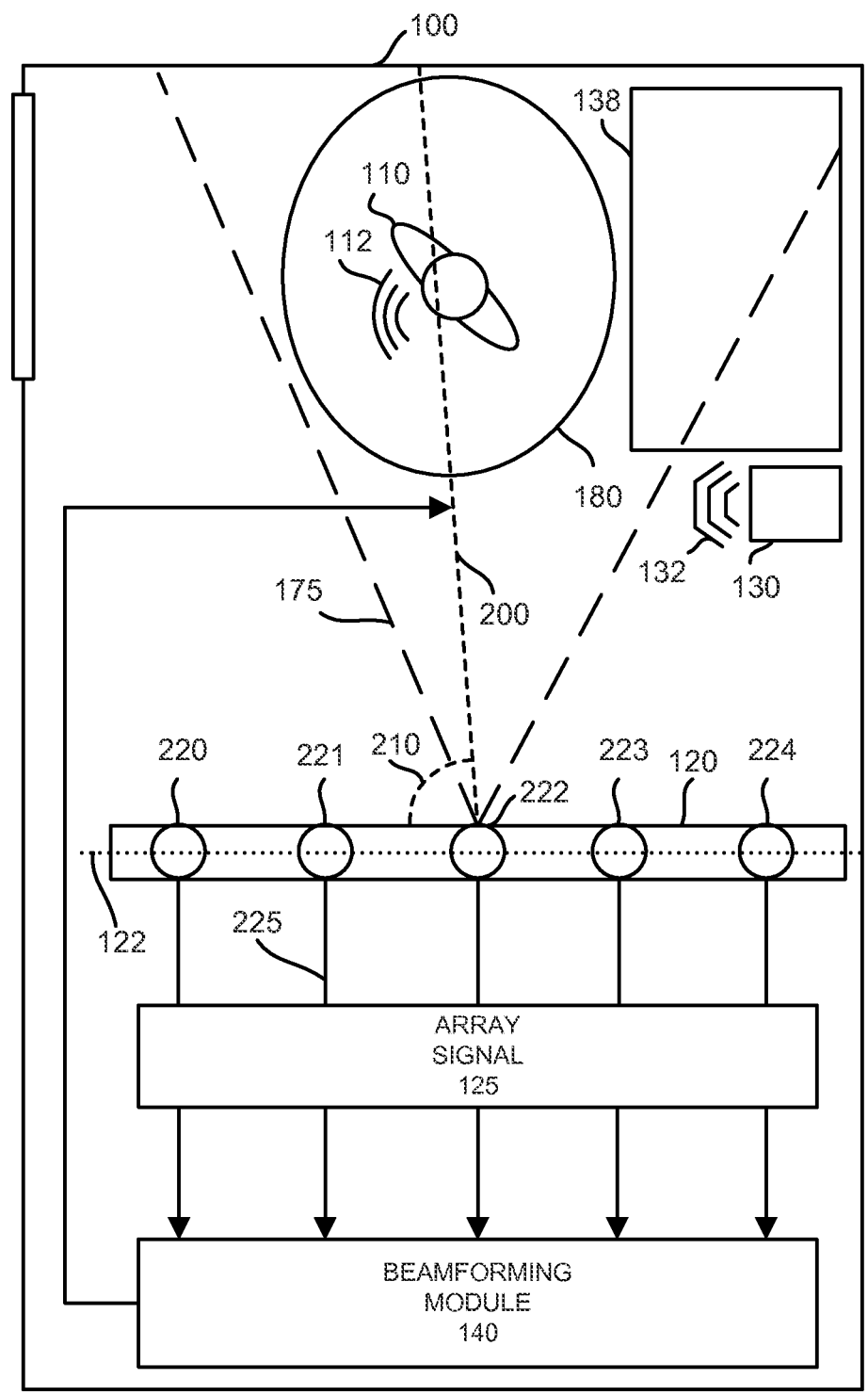
FIG. 2 is a detailed diagram of one of the microphone arrays of the embodiment of the voice controlled medical system shown in FIG. 1.

FIG. 2 includes a detailed diagram of one microphone array 120 of medical system 105. Microphone array 120 comprises a plurality of microphones 220-224. In several embodiments, microphones 220-224 are arranged in a linear fashion in array 120, creating longitudinal axis 122 of array 120. Each microphone 220-224 produces a microphone signal 225. Array signal 125 comprises microphone signals 225. In some embodiments, a high-pass filter is applied to microphone signals 225 or array signals 125,125', because it is easier to locate the source 110 of high-frequency sounds than low-frequency sounds. This would improve the performance of beam module 140 at locating sound source 110, and would also filter out low-frequency noise 132.

Beam module 140 forms a beam 200 using array 120 by altering the phase of microphone signals 225 relative to each other. For example, in FIG. 2, operator 110 (the loudest sound source in beam region 175) is closest to microphone 222 in the center of array 120, and is furthest from the outer microphones 220, 224. Beam module 140 recognizes operator 110 as the loudest sound source within beam region 175 and forms a beam 200 toward operator 110. Since the center microphone 222 is closest to operator 110, it will receive operator speech 112 the soonest, followed by the microphones 221, 223 directly to the sides of the center microphone 220. The outer microphones 220, 224 will be the last to receive operator speech 112, because they are the furthest from operator 110. Based on these inputs, beam module 140 retards the phase of the signals 225 from center microphone 222 and microphones 221, 223 directly to the sides of center microphone 222. Beam module 140 then combines all of the microphone signals 225, which has the effect of temporally combining the operator speech 112 in each of the microphone signals 225, which will amplify operator speech 112 coming from operator 110 while filtering out sounds in operating environment 100 that array 120 receives from other directions. Thus, beam 200 will effectively be pointed at operator 110. Beam module 140 will know the beam angle 210 with respect to array longitudinal axis 122 based on the phase alterations it performs on each microphone signal 225 in order to form beam 200 toward operator 110.

If only first microphone array 120 were used, sound sources in front of and behind operator 110 relative to first array 120 may interfere with the operation of medical system 105, because beam 200 would also be pointed towards those unwanted sources. As a result, noise 132 (or third-party speech 146) would be incorporated into beamed signal 142. Noise 132 (and third-party speech 146) interferes with the ability of voice interpreting module 135 to interpret operator speech 112, which reduces performance of medical system 105. In the example shown in FIG. 3, persons 145 are located in front of and behind operator 110 with respect to the first array 120. As a result, speech and noise 146 produced by persons 145 would reduce performance of voice interpreting module 135 if first array 120 were being used as the only source of audio input. However, because second array 120' is also being used in this embodiment, sounds 146 from persons 145 in front of and behind operator 110 can be excluded by medical system 105 because they did not originate in the area where first and second beam regions 175, 175' intersect.

Figure 3A:
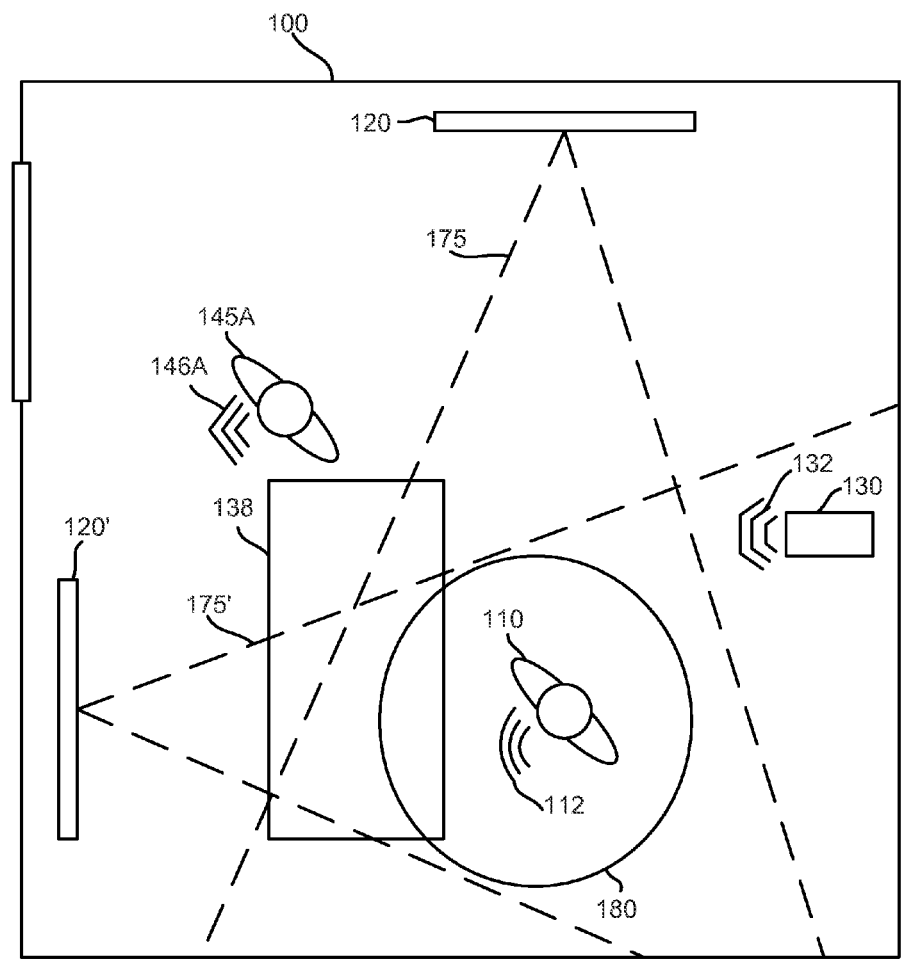
FIGS. 3A-3D are a diagrams of the command area of the embodiment of the voice controlled medical system shown in FIG. 1 with an operator located therein and noise sources surrounding the command area.

Also shown in FIGS. 3A-D is noise 132 emanating from medical instruments 130, which are in second beam region 175' of second array 120', but not first beam region 175. Since noise 132 originated from outside of first beam region 175, medical system 105 will exclude noise 132 to improve performance (because beam module 140 will not form a beam 200 from first array 120 toward medical instruments 130). One person 145A in FIG. 3A is located outside of both beam regions 175,175' and sounds 146 emanating from this source are also excluded by medical system 105. Unless beam module 140 forms beams 200,200' from both arrays 120,120' toward a sound source, sounds from that source will usually be excluded by medical system 105.

During non-speech intervals an estimate of noise characteristics can be made for each microphone array. During speech intervals where possible commands are being made, the system can suppress the noise in one or both of the beamed signals or exclude the use of one or both of the beamed signals for speech command interpretation. The decision to suppress sounds as noise may be based on the signal-to-noise ratio (SNR) determined using an estimate of noise characteristics. The decision may also be determined by the properties of the estimated noise characteristics, including a degree of stationary, or stability over time. Since it would be expected that some noise producing devices would remain stationary and with a relatively consistent sound, the noise could be estimated and thus suppressed. In addition, a number of medical instruments may produce a predictable noise, thus the system can be configured to know when a certain medical device is activated and the noise can be determined based on an expected noise from a particular device. As an example, a drill would be expected to create a relatively consistent noise from procedure to procedure. Further, the drill may be activated by the physician on demand. Such a medical instrument can be connected to the medical system 105, for example by wireless protocol, in order to send a signal to the medical system 105 that the medical instrument is activated. A sound or noise profile could be associated with this medical instrument and thus the actual noise could be compared to the noise profile and the actual noise may then be suppressed. The noise profile may be accessible to the controller via a database or another storage. The noise profile may also be accessible via the medical device itself, thus the medical device could have a noise profile stored on a electronic storage associated therewith and the noise profile could be compared with actual noise to determine sounds to suppress from the beamed signals. In addition, the noise profile of a particular instrument may be updated as the actual noise produced by the instrument changes over time.

The estimated noise characteristics for each microphone array may be dependent or independent of the beam angle. Beam angle dependent noise characteristics may be found during non-speech intervals by scanning the beam angle of each array through its beam region and recording for each angle the detected non-speech characteristics.

In one embodiment, the correlation may be used to determine if a command is contained in the beamed signals. One example of how correlation may be determined is discussed in U.S. Pat. Pub. US-2011-0063429-A1, the content of which is incorporated herein by reference. In another embodiment the beam module generates beamed signals intersecting at the source that is closest to the last known position of desired source 110. If the competing sources are sufficiently separated, then both arrays will pick up the correct source and the signals will be highly correlated, avoiding rejection of a signal that includes a command.

The sound signal from the array where the sources are not angularly separated will contain sounds from both sources. In one embodiment the signals from the two arrays are poorly correlated and may be rejected. In another embodiment, one array may be used to determine noise contained in the other array, thus the noise may be eliminated from a beamed signal containing both noise and a command. In another embodiment the array without angular separation of the sources is ignored and the other array is steered toward the source which is closest to the last known position of the desired speaker.

In a case where neither array separates competing sources, sound signals from both arrays would contain a mix of both sources, and the voice interpreting module may use a confidence measurement to reject some or all of the input speech as invalid.

Figure 3B:
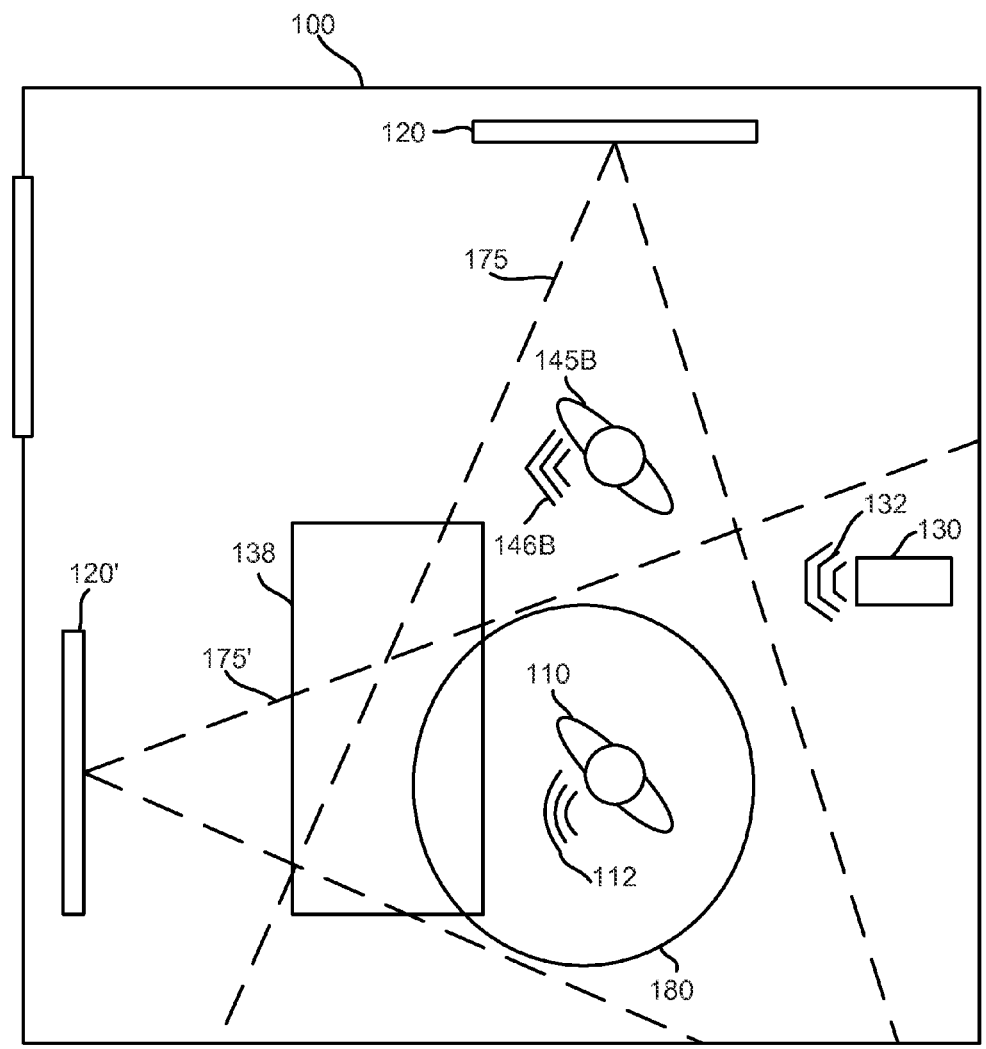
Figure 3C:
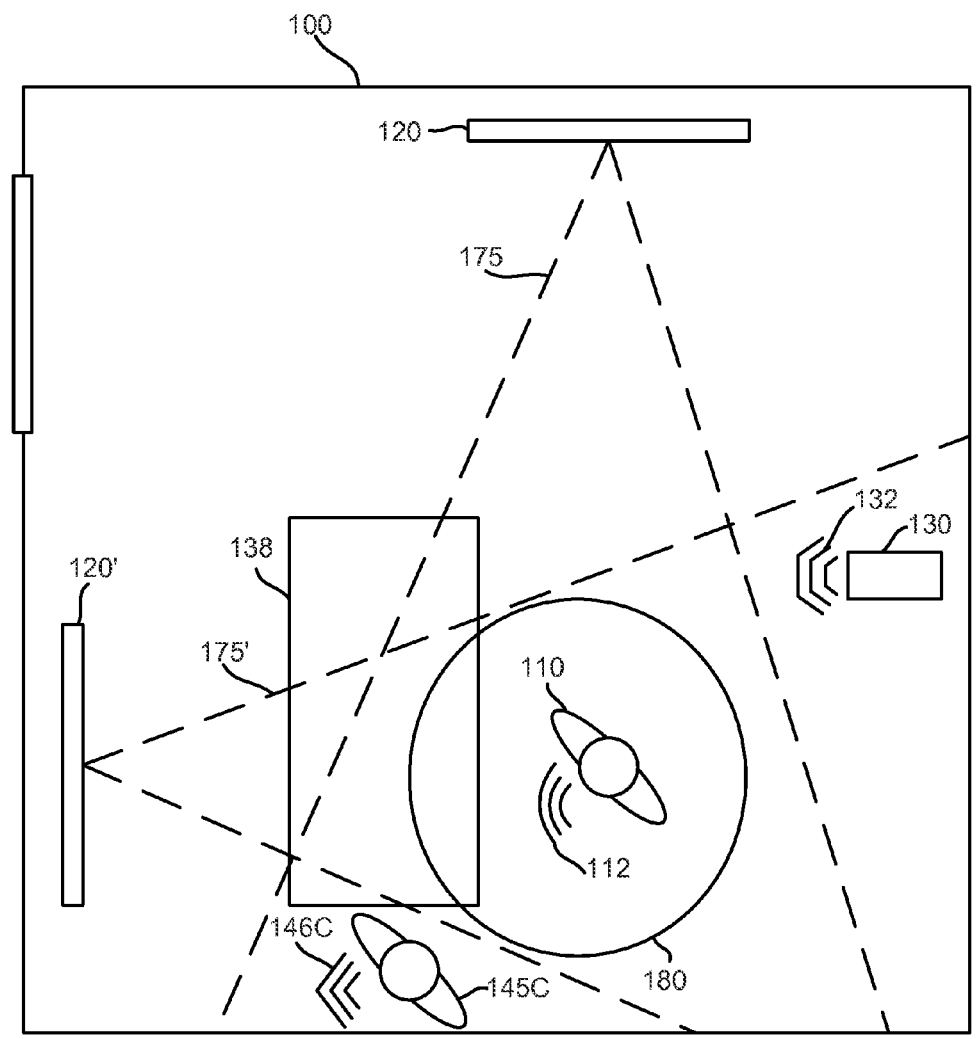
Figure 3D:
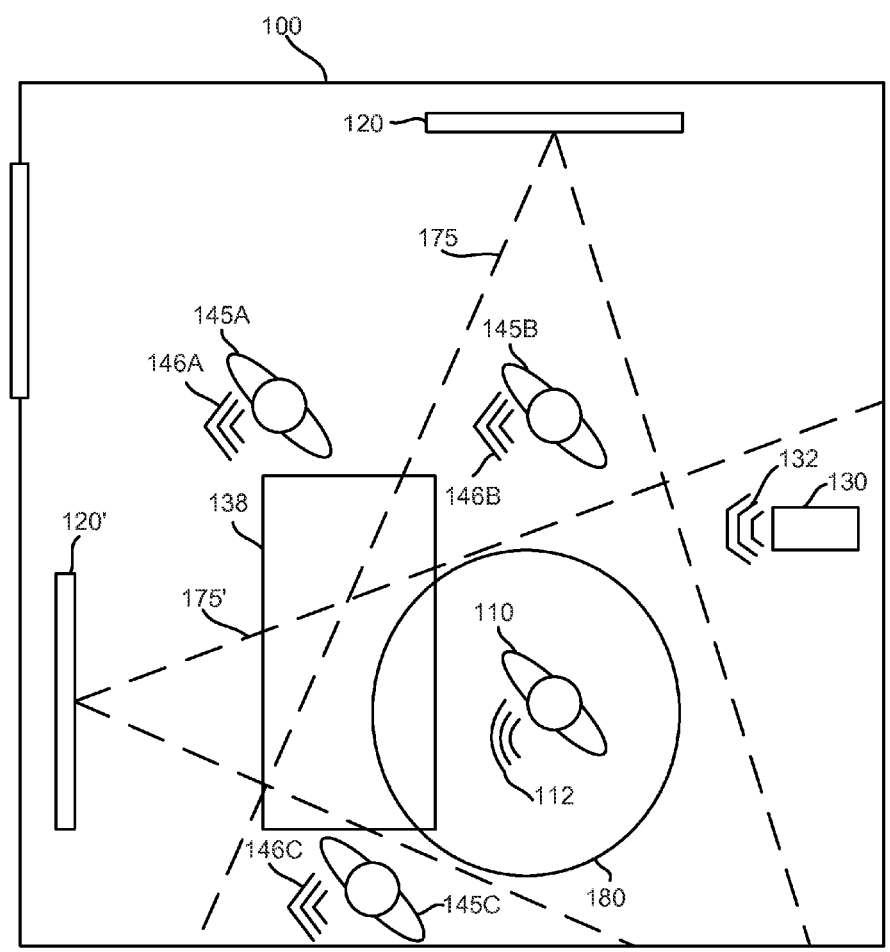

In FIG. 3A, the third party speech 146A is shown outside of both of the beam regions 175, 175'. Thus the system can determine based on location alone that the third party speech 146A does not contain any valid commands. In FIG. 3B, an example is shown where the beam angles would be expected to intersect but the correlation or similarity would be low. The third party speech 146B is shown within beam region 175, but outside beam region 175'. Further, in relation to array 120, third party speech 146B is approximately along the same line as operator speech 112. Therefore, array 120 may receive a sound that is a combination of 146B and 112 along the same beam angle. Thus, the system may determine which speech 146B or 112 may contain a valid command by looking at the relevant beam angle in relation to array 120' with respect to the command area to determine that speech 112 may contain a valid command and speech 146B is third party speech. Even though speech 146B and speech 112 may be approximately co-linear or along the same beam with respect to array 120, array 120' can determine that speech 146B and speech 112 have different beam angles and are thus different sources. Thus, the third party speech 146B can be separated from speech 112 by the medical system. Thus, array 120 can form a beam that intersects with a beam formed by array 120', where the intersection occurs in the command area, allowing the system to use speech recognition to determine if commands are contained in the beamed signal from array 120'. In FIG. 3C, an example is shown where the beamed signals will intersect in the command area and the correlation would be expected to be relatively high, or at least above the threshold. Third party speech 146C is located within beam region 175, but outside beam region 175'. Further, the third party speech 146C does not share a common beam angle with operator speech 112 with respect to either array 120, 120'. Thus, third party speech 146C can be ignored both because it is outside of one of the beam regions and because it is along a different beam with respect to both arrays. FIG. 3D shows an example where multiple sources 145A-C of third party speech 146A-C are present in the operating environment 100. In this case, if the automatic speech recognition confidence level for array 120' and/or array 120 are high and a dangerous condition is unlikely to result from executing the command, the system could execute a command identified in the sound. If multiple or all sources shown in FIG. 3D are talking at the same time, a low correlation value would be expected, however, the beamed signals could be generated for each source such that parts of the sound contained in speech 146A-C can determined to be noise and beamed signal that is associated with speech 112 in the command area can be evaluated for commands knowing what noise exists in the operating environment.

Figure 4A:
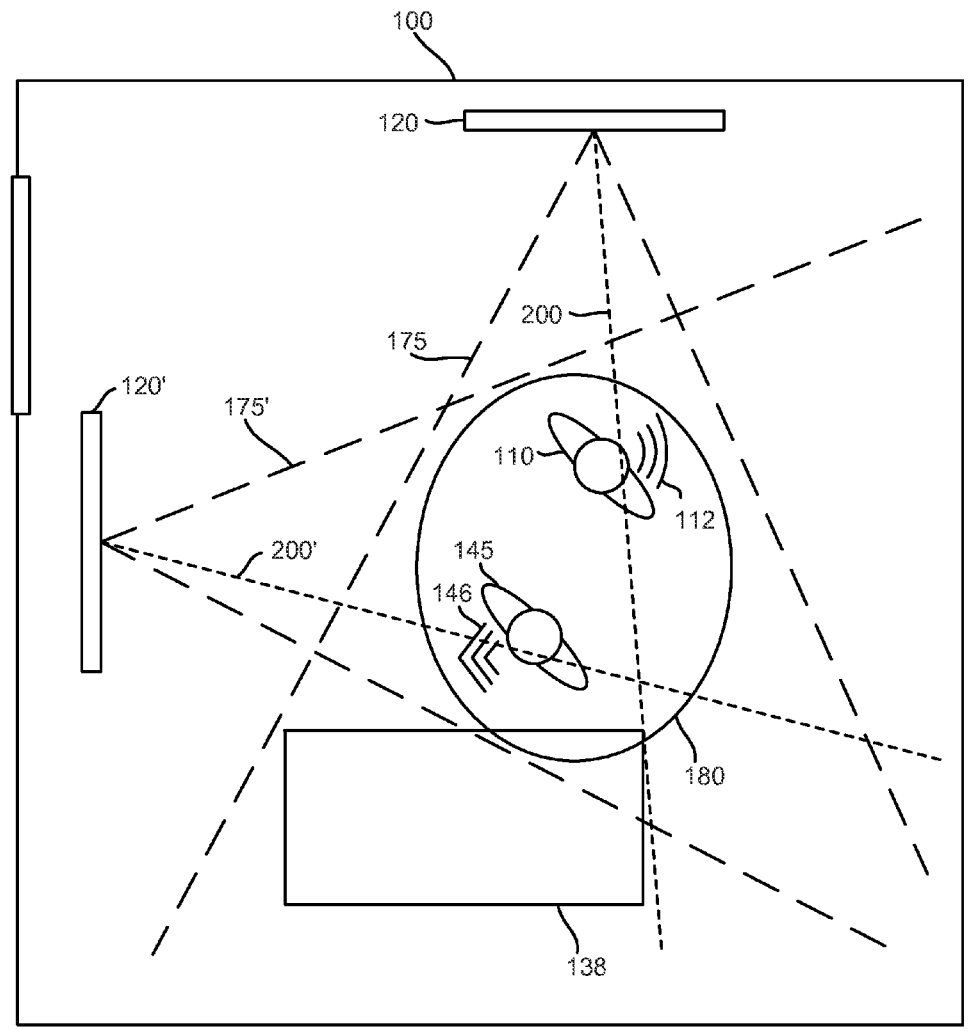
FIG. 4A is a diagram of the command area of the embodiment of the voice controlled medical system shown in FIG. 1 with multiple sound sources located therein.

In several embodiments, beam module 140 is configured to form beams 200,200' from each microphone array 125, 125' toward the loudest noise within each respective beam region 175,175'. In FIG. 4, two competing loud sounds occur simultaneously and originate from the within command area 180, e.g. a speech 112 from operator 110 and third-party speech 146 from a second talker (person 145). The voice controlled medical system 105 using multiple microphone arrays 125,125' disclosed herein handles this situation as follows. If the two sound sources (110, 145) are sufficiently spatially or angularly separated with respect to both arrays 120,120' (as shown in FIG. 4), then both arrays 120,120' will localize one of the sources. In this case, beam module 140 has formed first beam 200 from first array 120 toward operator 110, which is the closest and loudest noise source to first array 120. Beam forming module 140 has formed second beam 200' from second array 120' toward person 145, which is the closest and loudest noise source to second array 120'. If different sound sources are localized at the two arrays, the correlation between the two array signals 125, 125' (and beamed signals 142,142' derived therefrom) will be low (i.e. below correlation threshold 165) and comparison module 160 will reject signals 125,125' and/or disable speech input to the voice control system 105. In other embodiments, when the two sound sources 110,145 are sufficiently spatially or angularly separated with respect to both arrays the beam module can determine which source is closest to the last known position of operator 110. The initial known position of the desired speaker may be pre-determined, based on where the speaker is expected to be conducting the surgery, or it can be set to the position of the speaker which issued the most recent valid command.

If the two sounds sources 110,145 are sufficiently angularly separated with respect to only one of the arrays 120,120'ven if the two sound sources 110,145 are not sufficiently angularly separated with respect to either array 120,120', the two sounds 112,146 produced by those sources 110, 145 may often be mixed with different gains in array signals 125,125'. Therefore, array signals 125,125' from first array 120 and second array 120' (and beamed signals 142, 142' derived therefrom) will often not be sufficiently highly correlated, and comparison module 160 will reject signals 125,125' and/or disable speech input to the voice control system 105. When two sound sources are within the command area, the beam module can compare the locations or angles of the two sound sources and determine which source is closest to the last known position of desired source 110. If the competing sources (for example 145/112 in FIG. 4A) are sufficiently separated, then both arrays will pick up the correct source and the signals would be expected to have a correlation above the threshold. If the sources are not separated, then at moments when the speakers are both talking, sounds from the sources will be mixed and the voice interpreting module may compare the sounds to reject speech as invalid (or not a valid command). In addition, if the source identified is closest to the last known position of a desired speaker and a confidence value based on automatic speech recognition is high, the system may be able to identify commands contained in the sounds to operate the controller. In some cases, two sources may not be sufficiently separated such that the first and second beamed signals contain sounds from both sources and the two sources are competing. In some cases, the automatic speech recognition techniques can be used to identify commands in the respective sounds and if the confidence measure of the automatic speech recognition is high and one or more of the competing sources are found to have a command, the command can be acted upon. In some cases, the system may generate a sound that identifies the command identified and ask for confirmation of the command. Upon receipt of a confirmation such as a pre-determined word or sound, the system could then execute the command. This scenario could be particularly useful when there are numerous competing sources that are insufficiently separated or in situations where the similarity value/correlation/confidence level is close to meeting the system requirements for a valid command. Thus, the system can be programmed to verify commands in close cases. It is also understood that the system can be programmed to use such a verification procedure for additional safety. It is also contemplated that some commands could be considered more critical or drastic changes that result in a heightened safety concern, thus the system could use a verification procedure for such commands. Such safety concerns could be set depending on the procedure or other physiologic data or health markers with a rules based system, thus potentially dangerous commands could be identified and verified before they are executed by the system.

It is also contemplated that commands can come from more than one source and the arrays can generate additional beamed signals and use a similarity measure such as correlation to determine which pair of beamed signals correspond to which of the sources in order to determine which sources are in the command area. It is also contemplated that when two or more sources are identified within the command area, commands can be executed for both sources assuming the commands are consistent with the procedure. For example, an anesthesiologist may speak a command at the same or similar time as a orthopedic surgeon, and both commands may be valid. Since one command is relating to the anesthesiologist's settings and the other command is related to the surgeon's settings, the system could recognize both commands as valid and execute both commands. The verification and rules procedures discussed above can also be used in such a scenario. The two sources may have different volumes or amplitudes. Typically the microphone arrays would point to the loudest sound, however the beam module allows the system to listen to both sounds to separate the sounds originating from the two different sources. Since there are two arrays performing the same task of identifying the different sounds, the correlation further verifies which two beamed signals correspond to which source. Assuming the beamed signals are highly correlated, the system can execute the commands contained in the sound(s).

Figure 4B:
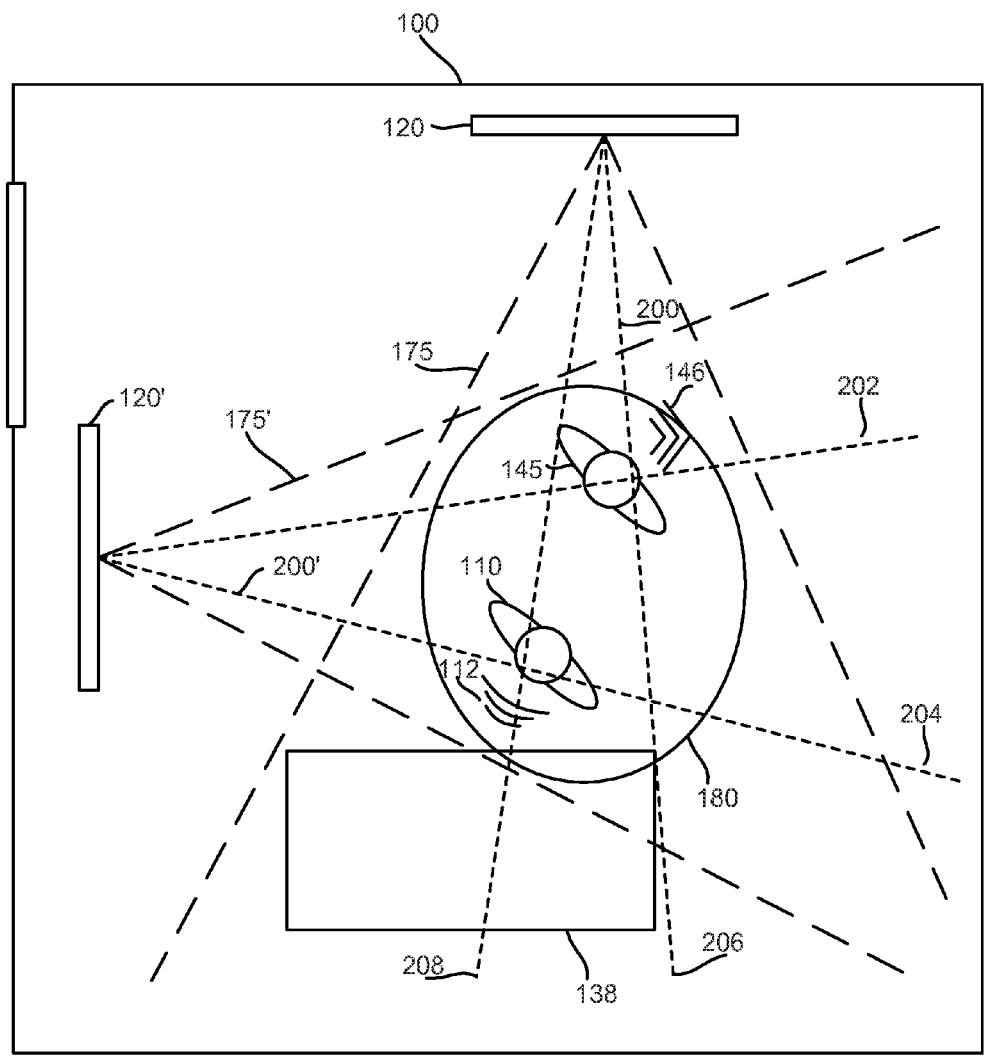
FIG. 4B is another diagram of the command area of the embodiment of the voice controlled medical system shown in FIG. 1 with multiple sound sources located therein

FIG. 4B shows an example where there are two speakers 145, 110. In some cases, these two speakers may speak in a similar volume level. Beams 200, 202, 204, 208 are all formed to separate the sounds 146/112. As can be seen, the intersection of beam 202 and 208 is not at a location of either source 145/110, thus allowing the system to separate the sounds 146/112 from each other. As can be seen, both sources 145/110 are within the command area 180, thus the system has an option of determining a command contained in the sounds 146/112 for either or both sounds. In some cases, the system may be designed such that the source 110 closer to the operating table 138 would be accepted simply because of the proximity to the patient. In other cases, both sounds 146/112 may include commands, depending on what the commands are, and a measurement of physiological or operating environment parameters may allow the system to determine if the commands are conflicting or not. An example of conflicting commands is one command dictating an increase in a flow rate of an anesthetic and the other command dictating a decrease in the flow rate of the same anesthetic. Thus, when commands are conflicting, the system would not execute the commands. As an example of non-conflicting commands, one command may dictate an increase in anesthetic and another command may turn on suction or activate some tool in the operating theater. In some cases, it would be expected that these two commands would come from different sources, thus is source 145 is the anesthesiologist and source 110 is the orthopedic surgeon, both commands would be accepted as within the command area 180 and each sufficiently correlated. As an example, beam 208 may pickup sound 112 and this sound may be subtracted or suppressed from the sound picked up via beam 206 because sound 112 can be identified as noise within the sounds picked up through beams 202/206, thus conditioning the signal to increase the clarity of the sound detected at the intersection of beams 202/206 such that correlation would be expected to be higher (or above the threshold).

If the correlation is not above the threshold, but the automatic speech recognition confidence value is high in any of the above cases, the system may request confirmation of a command by repeating the command or repeating a computer generated version thereof. The system may audibly ask for confirmation of the command before proceeding.

The situation of multiple competing sound sources within command area 180 can also be handled by using software or user input to intelligently handle the conflicting signals in array signals 125,125'. For example, in some embodiments comparison module 160 forwards beamed signals 142,142' from both arrays 120,120' to voice interpreting module 135, so that both audio 112,146 from both sources 110, 145 are individually interpreted for commands 115. In some embodiments, voice interpreting module 135, instrument control module 136, and/or medical system 105 comprise software that intelligently parses and executes simultaneous commands 115 from multiple sources. In some embodiments, medical system 105 issues a warning to operator 110 and/or other persons 145 in operating environment 100 when multiple simultaneous commands 115 are received.

Figure 5:
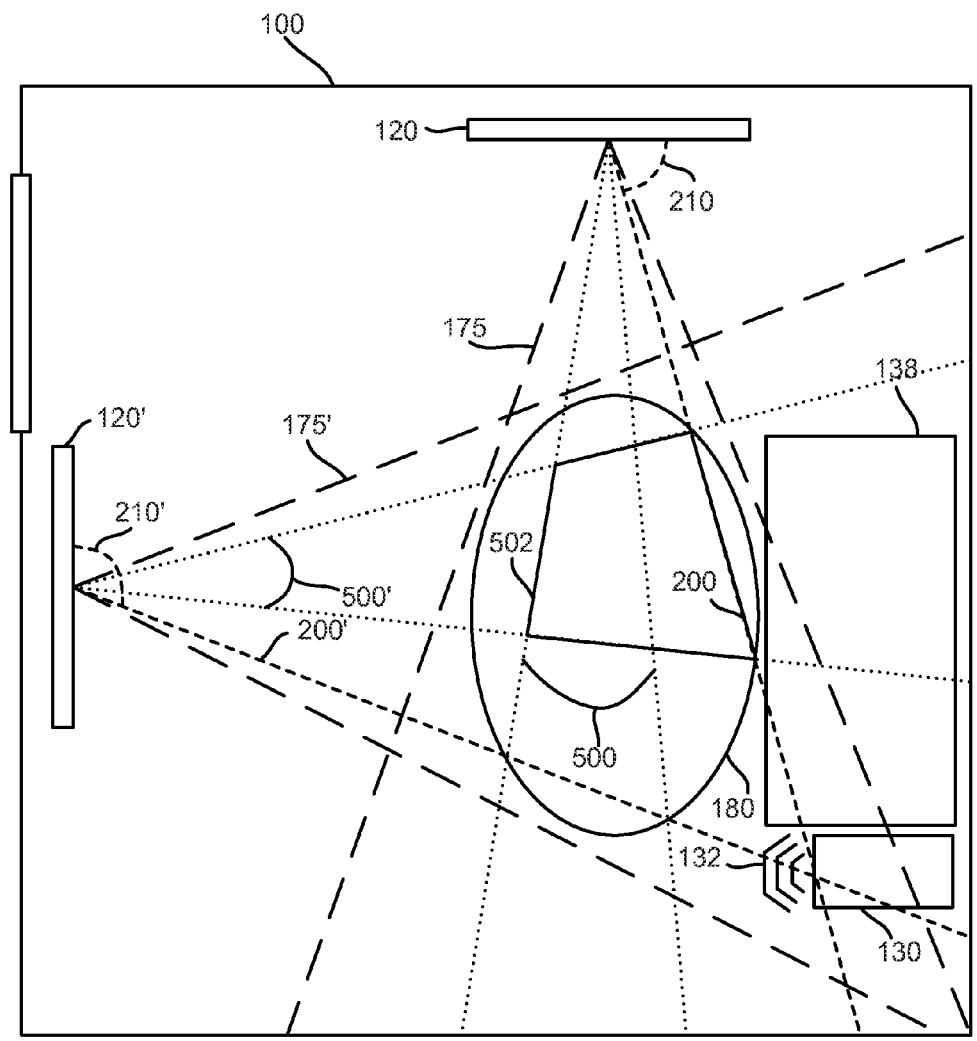
FIG. 5 is a diagram of the command area of the embodiment of the voice controlled medical system shown in FIG. 1 with a noise source outside of the command area.

In some embodiments, beam module 140 or another component of medical system 105 determines the angle 210,210' of each beam 200,200' and determines if the intersection of beams 200,200' is within command area 180. In the example shown in FIG. 5, medical instruments 130 are producing noise 132 that is within the beam regions 175,175' of both arrays 125,125'. However, medical instruments 130 are outside of command area 180. Medical system 105 can reduce interference from noise 132 sources within both beam regions 175,175' but outside of command area 180. Medical system 105 uses known beam angles 210,210' and known locations of arrays 120,120' to determine whether the source of noise 132 is inside or outside of command area 180. For example (and as shown in FIG. 5), at a given second beam angle 210', sounds will only be accepted by medical system 105 if they are at an angle (i.e. first beam angle 210) relative to first array 120 that is within a accepted range 500. Medical system 105 may also set a permissible range of second beam angles 210' that it will accept for a given first beam angle 210. Accepted range 500 of first beam angle 210 is determined by where second beam 200' intersects the outer boundary of command area 180. Also shown is accepted range 500' of second beam angle 210', which is defined where first beam 200 intersects the outer boundary of command area 180. Thus the system may narrow the command area 180 to a reduced command area 502 which is defined by the intersection of accepted angles 500 and 500' within the command area. Thus, the system may be configured to accept commands only from the reduced command area 502. If a source of noise 132 results in a first beam 200 having a beam angle 210 that is outside of the accepted range 500 (such as medical instruments 130 in FIG. 5), beam module 140 (or another component of medical system 105) will recognize that the sound source is outside of command area 180. If a source of noise 132 is outside of command area 180 (as shown in FIG. 5), medical system 105 will exclude noise 132 to improve speech recognition performance. If noise 132 is not aligned with operator 110, then the noise 132 may be excluded. If noise 132 is aligned with operator 110 with respect to one of the arrays (ie along a common beam), then the other array may be used to exclude the noise based on the noise 132 and operator 110 being separated with respect to the other array. Thus, the other array can determine the sound signal associated with the noise 132, and the sound signal of the noise 132 may be suppressed from both arrays.

If the arrays are sufficiently separated, for example the angle subtended by the centers of the two arrays with respect to the command area is sufficiently close to a right angle, then the noise source outside of the command area 132 cannot be aligned with desired speaker 110 in both arrays. It is understood that although the system has been shown with the arrays pointed at approximately right angles with respect to each other, the system can also work with different relative angles between the two arrays. It is understood that placing the arrays at right angles with respect to the command area is but one embodiment of the present invention.

In some embodiments, if beam module 140 or another component of medical system 105 determines that a noise 132 originated from outside command area 180, it will not send beamed data 142,142' to voice interpreting module 135.

Figure 6:
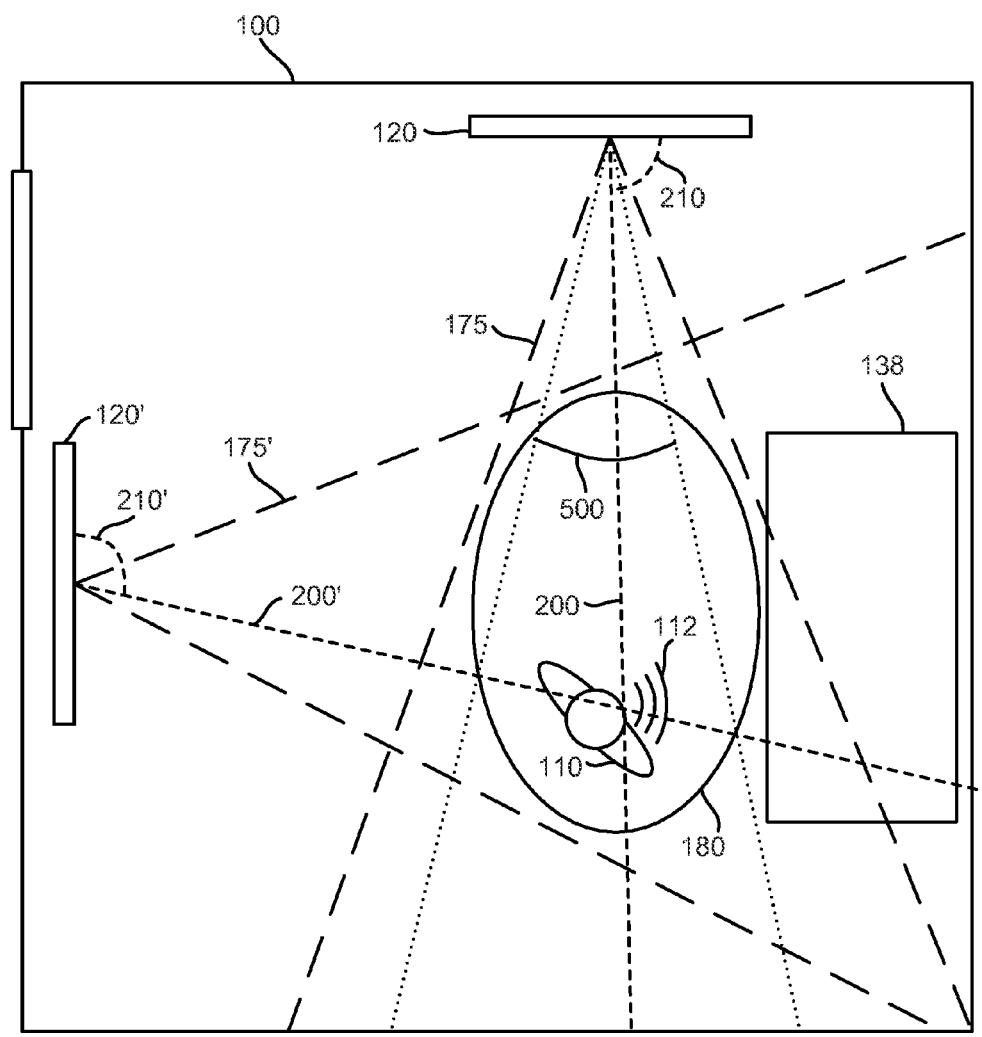
FIG. 6 is a diagram of the command area of the embodiment of the voice controlled medical system shown in FIG. 1 with an operator located therein.

In the example shown in FIG. 6, the loudest noise in both beam regions 175,175' is speech 112 issued by operator 110. Beams 200,200' are formed from both arrays 120,120' toward operator 110. Medical system 105 determines beam angle 210,210' for both beams 200,200' and determines that first beam angle 210 is within accepted range 500 and that second beam angle is within accepted range 500'. Based on this information, medical system 105 determines that the source of operator speech 112 is within command area 180. Voice interpreting module 135 interprets operator speech 112 because it originated from within command area 180 and determines commands 115 contained with operator speech 112. Medical system 105 then instructs instrument control module 136 to execute commands 115 on medical instruments 130.

Figure 7:
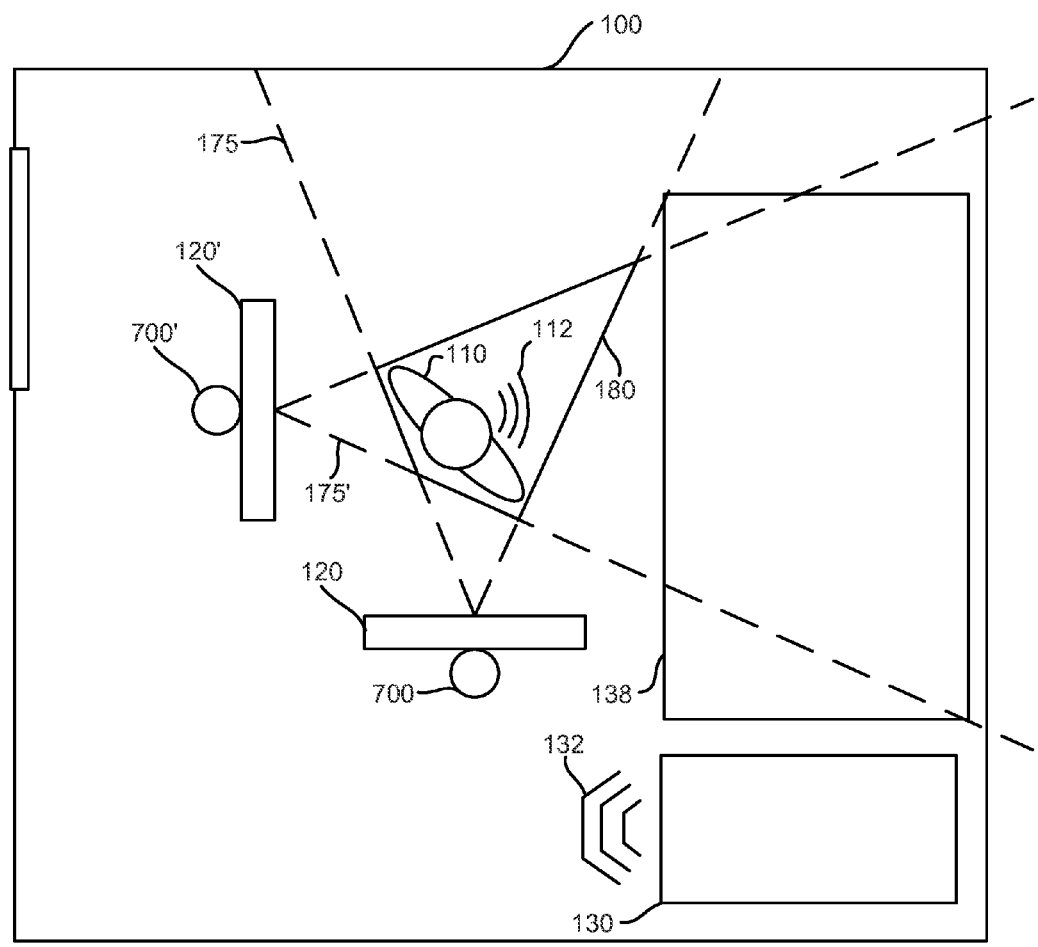
FIG. 7 is a diagram of the command area of the embodiment of the voice controlled medical system shown in FIG. 1 with the microphone arrays mounted on boom arms.

FIG. 7 shows an embodiment of medical system 105 in which arrays 120,120' are mounted on boom arms 700,700'. When attached to boom arms 700,700', the positions of arrays 120,120' can be easily adjusted so that a technician or operator 110 can position arrays 120,120' in his/her direct vicinity prior to an operation. In some embodiments, boom arms 700,700' are configured as a single unit. When arrays 120,120' are pointed directly at operator 110 from a short distance away, the region where beam regions 175,175' overlap (command area 180 in this embodiment) is small enough to include operator 110 and no other sources of noise 132. This will improve the speech recognition performance of medical system 105. In this embodiment, less analysis as to the location of operator 110 is needed because the intersection of beam regions 175,175' is sufficiently small to exclude other sources of noise 132 or third-party speech 146.

Although the invention has been described with reference to embodiments herein, those embodiments do not limit the scope of the invention. Modifications to those embodiments or different embodiments may fall within the scope of the invention.

What is claimed is:

1. A voice controlled medical system with improved speech recognition, comprising:
   a first microphone array having a first axis extending therefrom towards a command area;
   a second microphone array having a second axis extending therefrom and intersecting said first axis in the command area;
   a controller in communication with said first and second microphone arrays;
   a medical device operable by said controller;
   said controller comprising:
      a beam module having software executing on a processor that generates a first beamed signal using signals from said first microphone array and a second beamed signal using signals from said second microphone array;
      a comparison module having software executing on a processor that compares the first and second beamed signals to determine a similarity value between the first and second beamed signals;
      a voice interpreting module having software executing on a processor that identifies commands originating from the command area based at least in part on whether the similarity value is above a threshold; and
      an instrument control module having software executing on a processor that executes the commands to operate said medical device;
   wherein commands originating from outside the command area are excluded by the medical system based at least in part on whether the similarity value is below the threshold.

2. The system of claim 1 wherein the similarity value is a correlation determined based on a sound signal of the first and second beamed signals.

3. The system of claim 1, wherein the first axis and second axis are perpendicular to each other.

4. The system of claim 1, wherein said comparison module compares beam angles of the first and second beamed signals to determine if a sound received by at least one of said microphone arrays originated in the command area.

5. The system of claim 1, wherein locations of said first and second microphone arrays and the command area are adjustable.

6. The system of claim 5, wherein said first and second microphone arrays are mounted on boom arms.

7. The system of claim 1, wherein said beam module limits angles of beams of the first and second beamed signals with respect to the first and second axes.

8. The system of claim 1, wherein said beam module forms a first beam of the first beamed signal in a direction of a source of a loudest sound received by said first microphone array, and forms a second beam of the second beamed signal in a direction of a source of a loudest sound received by said second microphone array.

9. The system of claim 8, wherein said instrument control module only executes commands from origins of the loudest sounds received by said first and second microphone arrays.

10. The system of claim 8, wherein the similarity value is a correlation and the comparison module determines that the first and second beamed signals correspond to separate competing sources if the correlation between the source of the loudest sound received by said first microphone array and the source of the loudest sound received by said second microphone array is below the correlation threshold.

11. The system of claim 1, wherein said beam module forms a first beam of the first beamed signal in a direction of a source of a sound, received by said first microphone array, which is closest to a position associated with a previous command, and forms a second beam of the second beamed signal in a direction of a source of a sound, received by said second microphone array, which is closest to a position associated with a previous command.

12. The system of claim 1 wherein said similarity value is a correlation.

13. The system of claim 1 wherein said similarity value is an automatic speech recognition confidence level.

14. A voice controlled medical system with improved speech recognition, comprising:
a first microphone array having a first axis extending therefrom towards a command area;
a second microphone array having a second axis extending therefrom and intersecting said first axis within the command area;
a controller in communication with said first and second microphone arrays that forms a first beam using said first microphone array and forms a second beam using said second microphone array;
a medical device operable by said controller;
said controller executes commands contained in signals from said first and second microphone arrays when the first and second beams intersect within the command area;
wherein sounds originating from outside the command area are excluded by the medical system.

15. The system of claim 14, wherein the first axis and second axis are perpendicular to each other.

16. The system of claim 14, further comprising:
a first audio signal from said first microphone array;
a second audio signal from said second microphone array;
said controller comparing said first audio signal to said second audio signal to determine if a sound received by at least one of said microphone arrays originated in the command area.

17. The system of claim 14, wherein locations of said first and second microphone arrays and command area are adjustable.

18. The system of claim 17, wherein said first and second microphone arrays are mounted on boom arms.

19. The system of claim 14, wherein said controller only forms the first beam within a limited set of angles with respect to the first axis, and said controller only forms the second beam within a limited set of angles with respect to the second axis.

20. The system of claim 19 wherein the limited set of angles with respect to the first axis is defined by two axes intersecting at said first microphone array and tangent to said command area and the limited set of angles with respect to the second axis is defined by two axes intersecting at said second microphone array and tangent to said command area.

21. The system of claim 14, wherein said controller forms the first beam in a direction of a source of a loudest sound received by said first microphone array, and forms the second beam in a direction of a source of a loudest sound received by said second microphone array.

22. The system of claim 21, wherein said controller does not execute commands contained in signals from said first and second microphone arrays if the source of the loudest sound received by said first microphone array is different than the source of the loudest sound received by said second microphone array.

23. The system of claim 14, wherein said controller determines a location of an origin of a sound based on a first angle of the first beam with respect to the first axis, a second angle of the second beam with respect to the second axis, and locations of said first and second microphone arrays.

24. The system of claim 14, wherein said controller forms the first beam in a direction of a source of a sound, received by said first microphone array, which is closest to a position associated with a previous command; and
wherein said controller forms the second beam in a direction of a source of a sound, received by said second microphone array, which is closest to a position associated with a previous command.

25. A method of operating a medical device using voice commands, comprising:
(a) receiving a plurality of first microphone signals from a first microphone array having a first axis extending therefrom towards a command area;
(b) forming a first beamed signal using the first microphone signals via software executing on a processor;
(c) receiving a plurality of second microphone signals from a second microphone array having a second axis extending therefrom and intersecting said first axis within the command area;
(d) forming a second beamed signal using the second microphone signals via software executing on a processor;
(e) comparing the first and second beamed signals via software executing on a processor to determine if a command is contained in the first and second beamed signals; and
(f) executing the command to operate the medical device;

wherein sounds originating from outside the command area are excluded by the medical system.

26. The method of claim 25, further comprising:
(g) determining a first angle of a first beam of the first beamed signal relative to the first array;
(h) determining a second angle of a second beam of the second beamed signal of the second array;
(i) determining a location of an intersection between the first and second beams; and
(j) executing a command to operate the medical device contained in the first or second beamed signals only if a level of correlation exceeds a correlation threshold and the intersection is within a predetermined region.

27. The method of claim 26, wherein steps (i) and (j) include determining an accepted range of second angles based on the first angle, determining whether the second angle falls within the accepted range, and only executing a command to operate the medical device contained in the first or second beamed signals if the second angle falls within the accepted range.

28. The method of claim 25, wherein step (b) comprises forming a first beam in a direction of a source of a loudest sound received by the first microphone array and step (d) comprises forming a second beam in a direction of a source of a loudest sound received by the second microphone array.

29. The method of claim 25, wherein step (b) comprises forming a first beam in a direction of a source of a sound received by the first microphone array closest to a previous command and step (d) comprises forming a second beam in a direction of a source of a sound received by the second microphone array closest to a previous command.

30. A voice controlled medical system with improved speech recognition, comprising:
a first microphone array;
a second microphone array;
a controller in communication with said first and second microphone arrays;
a medical device operable by said controller;
a beam module having software executing on a processor that generates a first beamed signal using signals from said first microphone array and a second beamed signal using signals from said second microphone array;
said controller determining whether the first and second beamed signals intersect within a command area;
a comparison module having software executing on a processor that compares sound signals of the first and second beamed signals and determines a correlation between the first and second beamed signals;
a voice interpreting module having software executing on a processor that identifies commands contained in the first and second beamed signals if the correlation is above a correlation threshold; and
an instrument control module having software executing on a processor that executes the commands to operate said medical device when the correlation is above the correlation threshold and when the first and second beamed signals intersect within the command area;
wherein commands originating from outside the command area are excluded by the medical system based at least in part on whether the correlation is below the correlation threshold.

31. The system of claim 30 wherein the comparison module determines a noise in at least one of the first and second beamed signals and the correlation is determined based on a sound signal of the first and second beamed signals.

32. The system of claim 30 further comprising:
a first axis extending from the first microphone array towards a command area;
a second axis extending from the second microphone towards the command area and intersecting said first axis within the command area.

33. The system of claim 32, wherein the first axis and second axis are perpendicular to each other.

34. The system of claim 30 wherein said beam module generates at least a third beamed signal associated with one of said first or second microphone arrays and further associated with a source outside the command area;
said comparison module comparing said third beamed signal with at least one of said first and second beamed signals to determine a sound contained in the third beamed signal and at least one of said first and second beamed signals; and
wherein the sound is excluded from said at least one of said first and second beamed signals.

* * * * *